(12) United States Patent
Parsons et al.

(10) Patent No.: US 8,509,767 B2
(45) Date of Patent: Aug. 13, 2013

(54) CONTROLLED ACCESS TO A WIRELESS NETWORK

(75) Inventors: Stephen Parsons, Bath (GB); David Thorn, London (GB); Stuart Cochran, Bath (GB)

(73) Assignee: Evolving Systems, Inc., Englewood, CO (US)

( * ) Notice: Subject to any disclaimer, the term of this patent is extended or adjusted under 35 U.S.C. 154(b) by 14 days.

(21) Appl. No.: 13/231,340

(22) Filed: Sep. 13, 2011

(65) Prior Publication Data

US 2012/0094633 A1 Apr. 19, 2012

Related U.S. Application Data

(63) Continuation-in-part of application No. 12/197,396, filed on Aug. 25, 2008, now Pat. No. 8,145,212, and a continuation-in-part of application No. 12/766,115, filed on Apr. 23, 2010.

(60) Provisional application No. 61/382,324, filed on Sep. 13, 2010, provisional application No. 61/382,311, filed on Sep. 13, 2010, provisional application No. 61/387,101, filed on Sep. 28, 2010, provisional application No. 61/387,110, filed on Sep. 28, 2010, provisional application No. 60/992,913, filed on Dec. 6, 2007, provisional application No. 61/172,350, filed on Apr. 24, 2009, provisional application No. 61/184,597, filed on Jun. 5, 2009.

(51) Int. Cl.
*H04W 4/00* (2009.01)

(52) U.S. Cl.
USPC ........ 455/434; 455/435.1; 455/455; 455/450; 455/452.1

(58) Field of Classification Search
USPC ............. 455/432.2, 435.1, 435.2, 435.3, 411, 455/433, 558; 380/241, 248
See application file for complete search history.

(56) References Cited

U.S. PATENT DOCUMENTS

| | | | |
|---|---|---|---|
| 5,887,253 A | 3/1999 | O'Neil et al. |
| 6,014,561 A | 1/2000 | Mölne |
| 6,167,251 A | 12/2000 | Segal et al. |

(Continued)

FOREIGN PATENT DOCUMENTS

| | | |
|---|---|---|
| EP | 1703760 A2 | 9/2006 |
| KR | 10-2001-0033025 A | 4/2001 |

(Continued)

OTHER PUBLICATIONS

International Search Report and Written Opinion of PCT/US2011/051464 mailed on Feb. 23, 2012, 8 pages.

(Continued)

*Primary Examiner* — Kathy Wang-Hurst

(74) *Attorney, Agent, or Firm* — Kilpatrick Townsend & Stockton LLP

(57) ABSTRACT

Various arrangements for permitting a wireless device occasional access to a wireless network are described. Some arrangements for assigning a single MSISDN to multiple wireless devices are described. In such arrangements, the wireless devices may be associated with different visitor location registers. In some arrangements, a wireless device-initiated bearer service is initiated based on input from a remote system. In some arrangements, a wireless device is authenticated based on whether data needs to be sent to and/or received from the wireless device.

17 Claims, 8 Drawing Sheets

(56) References Cited

U.S. PATENT DOCUMENTS

| | | |
|---|---|---|
| 6,591,098 B1 | 7/2003 | Shieh et al. |
| 6,680,601 B2 | 1/2004 | Wallgren |
| 6,836,651 B2 | 12/2004 | Segal et al. |
| 7,197,301 B2 | 3/2007 | Netanel |
| 7,266,371 B1 | 9/2007 | Amin et al. |
| 7,274,928 B2 | 9/2007 | Netanel et al. |
| 7,289,805 B2 | 10/2007 | Tom et al. |
| 7,386,302 B2 | 6/2008 | Riffe et al. |
| 7,424,442 B2 | 9/2008 | Wong et al. |
| 7,444,148 B1 * | 10/2008 | Cook .................. 455/435.1 |
| 7,991,394 B2 | 8/2011 | Gonen et al. |
| 8,145,212 B2 | 3/2012 | Lopresti et al. |
| 2001/0029182 A1 | 10/2001 | McCann et al. |
| 2002/0094808 A1 | 7/2002 | Tiedemann, Jr. et al. |
| 2002/0177440 A1 | 11/2002 | Mukherjee |
| 2003/0031305 A1 | 2/2003 | Netanel et al. |
| 2003/0119490 A1 | 6/2003 | Mohammed |
| 2003/0129948 A1 | 7/2003 | Gab et al. |
| 2003/0166398 A1 | 9/2003 | Netanel |
| 2005/0020234 A1 | 1/2005 | Iivari et al. |
| 2005/0181793 A1 | 8/2005 | Netanel |
| 2006/0035631 A1 | 2/2006 | White et al. |
| 2006/0143098 A1 | 6/2006 | Lazaridis |
| 2006/0205434 A1 | 9/2006 | Tom et al. |
| 2007/0300294 A1 | 12/2007 | Netanel et al. |
| 2008/0026740 A1 | 1/2008 | Netanel |
| 2008/0057935 A1 | 3/2008 | Netanel et al. |
| 2008/0081592 A1 | 4/2008 | Das et al. |
| 2008/0220740 A1 | 9/2008 | Shatzkamer et al. |
| 2009/0011759 A1 | 1/2009 | Alperovich et al. |
| 2009/0025070 A1 | 1/2009 | Netanel et al. |
| 2009/0067408 A1 * | 3/2009 | Leppainen et al. ........... 370/350 |
| 2009/0109987 A1 | 4/2009 | Kampmann et al. |
| 2009/0149175 A1 | 6/2009 | Lopresti et al. |
| 2010/0009659 A1 | 1/2010 | Netanel et al. |
| 2010/0159924 A1 | 6/2010 | Lagerman et al. |
| 2010/0273462 A1 | 10/2010 | Thorn et al. |
| 2012/0094634 A1 | 4/2012 | Parsons et al. |
| 2012/0184274 A1 | 7/2012 | Lopresti et al. |

FOREIGN PATENT DOCUMENTS

| | | |
|---|---|---|
| KR | 10-2005-0033956 A | 4/2005 |
| KR | 10-2006-0135003 A | 12/2006 |
| WO | WO 00/21275 A1 | 4/2000 |
| WO | WO 01/60092 A3 | 8/2001 |
| WO | WO 02/058361 A2 | 7/2002 |
| WO | WO 02/058361 A3 | 7/2002 |
| WO | WO 2008/118638 A1 | 10/2008 |

OTHER PUBLICATIONS

International Search Report and Written Opinion of PCT/US2010/032200 mailed on Nov. 30, 2010, 7 pages.

International Search Report and Written Opinion of PCT/US2008/082484 mailed on Jan. 7, 2009, 9 pages.

International Search Report and Written Opinion of PCT/US2011/051456 mailed on Apr. 17, 2012, 7 pages.

* cited by examiner

CONTROLLED ACCESS TO A WIRELESS NETWORK

CROSS-REFERENCES

This application claims priority to U.S. Provisional Patent Application No. 61/382,324, filed Sep. 13, 2010, entitled "Extended Wireless Device Activation," U.S. Provisional Patent Application No. 61/382,311, filed Sep. 13, 2010, entitled "Extended Occasional Access to a Wireless Network," U.S. Provisional Patent Application No. 61/387,101, filed Sep. 28, 2010, entitled "Semi-Permanent Access to a Wireless Network," and U.S. Provisional Patent Application No. 61/387,110, filed Sep. 28, 2010, entitled "Controlled Occasional Access to a Wireless Network," the entire disclosures of which are hereby incorporated by reference.

This application is a continuation-in-part of U.S. patent application Ser. No. 12/197,396, filed Aug. 25, 2008 by Lopresti et al., entitled "Wireless Device Activation," the entire disclosure of which is hereby incorporated by reference. U.S. patent application Ser. No. 12/197,396 claims the benefit, under 35 U.S.C. §119(e), of the filing date of provisional U.S. patent application Ser. No. 60/992,913, filed Dec. 6, 2007 by Lopresti et al. and entitled "Wireless Device Activation," the entire disclosure of which is hereby incorporated by reference.

This application is a continuation-in-part of U.S. patent application Ser. No. 12/766,115, filed Apr. 23, 2010 by Thorn et al., entitled "Occasional Access to a Wireless Network," the entire disclosure of which is hereby incorporated by reference. U.S. patent application Ser. No. 12/766,115 claims the benefit, under 35 U.S.C. §119(e), of the filing date of provisional U.S. patent application Ser. No. 61/172,350, filed Apr. 24, 2009 by Thorn et al. and entitled "Occasional Access to a Wireless Network," the entire disclosure of which is hereby incorporated by reference. U.S. patent application Ser. No. 12/766,115 also claims the benefit, under 35 U.S.C. §119(e), of the filing date of provisional U.S. patent application Ser. No. 61/184,597, filed Jun. 5, 2009 by Thorn et al. and entitled "Occasional Access to a Wireless Network," the entire disclosure of which is hereby incorporated by reference.

BACKGROUND

In order to operate on a wireless network (e.g., a GSM cellular network), a wireless device (e.g., a sensor configured to use a wireless network) generally must be registered on the wireless network. To activate the wireless device on the wireless network, a wireless provider generally undertakes a practice referred to herein as "activation," in which the wireless device is identified to the wireless network using an identifier (such as an international mobile subscriber identifier (IMSI) or similar identifying number, which, in many cases, is encoded on a subscriber identity module (SIM) of the wireless device. In a general sense, this process involves creating a record for the device. In some cases, the record comprises the identifying number, as well as an addressing number (e.g., a phone number for a wireless phone), such as an international ISDN number (MSISDN) or similar number. This record identifies the device to the network and provides information about the capabilities of the device.

Some wireless devices may only intermittently need to access a wireless network. For example, a sensor or meter that may need to periodically transmit data to a system may only need access to the wireless network once per day, week, or month. A assigning a permanent MSISDN may be inefficient if a limited number of MSISDNs may available for assignment. Other inefficiencies may also result from attempting to provide access to such wireless devices.

BRIEF SUMMARY

In some embodiments, a method for occasional access by a wireless devices to a wireless network is presented. The method may include receiving a first request to attach to the wireless network from a first wireless device, wherein the first request specifies a first international mobile subscriber identity (IMSI). The method may include authenticating the wireless device. The method may include assigning a mobile subscriber integrated services digital network number (MSISDN) to the first wireless device. The method may include exchanging data with the wireless device via the wireless network. The method may include determining that the exchange of data with the wireless device is complete. The method may include, in response to determining that the exchange of data with the wireless device is complete, deprovisioning the wireless device from the wireless network, wherein, following being deprovisioned, the wireless device cannot exchange data via the wireless network.

In some embodiments, one or more of the following may be present: Authenticating the wireless device may comprise authenticating, by a detection device, the wireless device, wherein authentication is performed without communication with an authentication center (AUC) and a home location register (HLR). While exchanging data with the wireless device via the wireless network, an entry in a home location register (HLR) of the wireless network may not be present for the wireless device. Exchanging data with the wireless device may comprise sending data to the wireless device and receiving data from the wireless device. The method may include, following deprovisioning the wireless device from the wireless network, assigning the MSISDN to a second wireless device. Determining that the exchange of data with the wireless device is complete may be based on a message received from a third-party system. The method may include transmitting provisioning information corresponding to the wireless device to a plurality of AUCs of the wireless network. The method may include receiving a response from at least one of the plurality of AUCs. Authenticating the wireless device may comprise selecting an AUC from the plurality of AUCs of the wireless network to receive authentication information corresponding to the wireless device based on a response time of the response of the AUC to the transmitted provisioning information. Authenticating the wireless device may comprise transmitting the authentication information corresponding to the wireless device to the selected AUC.

In some embodiments, a method for using a mobile subscriber integrated services digital network number (MSISDN) in conjunction with multiple wireless devices is presented. The method may include receiving a first request to attach to a wireless network from a first wireless device, wherein the first request specifies a first international mobile subscriber identity (IMSI). The method may include determining the request corresponds to a first visitor location register (VLR). The method may include assigning the MSISDN to the first wireless device. The method may include receiving a second request to attach to the wireless network from a second wireless device, wherein the second request specifies a second IMSI different from the first IMSI. The method may include determining the request corresponds to a second VLR, wherein the second VLR corresponds to a different geographic area than the first VLR. The method may include assigning the MSISDN to the second wireless device such that the first wireless device and the second wireless device are linked with the MSISDN concurrently.

In some embodiments, one or more of the following may be present: The method may include receiving, from a third-party computer system, data to be delivered to the second wireless device, wherein the data identifies the second wireless device. The method may include transmitting, to the second wireless device, at least some of the data. The data received from the third-party computer system may specify the second IMSI. The data received from the third-party computer system may specify the MSISDN and an identifier of the second VLR. The method may include, after assigning the MSISDN to the second IMSI, receiving data from the second wireless device. The method may include transferring the data to a third-party computer system. The first wireless device and the second wireless device may be non-mobile devices. The method may include determining the second wireless device is to be deprovisioned from accessing the wireless network. The method may include deprovisioning the second wireless device from accessing the wireless network wherein deprovisioning comprises revoking the MSISDN to the second wireless device, such that the second wireless device is required to reattach to the wireless network for future communication using the wireless network. Determining the second wireless device is to be deprovisioned from accessing the wireless network may comprise determining at least a threshold period of time has elapsed. The method may include receiving, from a third-party computer system, an indication that communication with the second wireless device is complete, wherein determining the second wireless device is to be deprovisioned from accessing the wireless network is at least partially based on receiving the indication.

In some embodiments, a method for communicating with a wireless device using a wireless device-initiated bearer service is presented. The method may include receiving a request to attach to a wireless network from the wireless device, wherein the request specifies an international mobile subscriber identity (IMSI). The method may include assigning a mobile subscriber integrated services digital network number (MSISDN) to the IMSI. The method may include transmitting a wireless device-initiated bearer service request to the wireless device via a first bearer service indicating that the wireless device-initiated bearer service is to be initiated. The method may include receiving an indication that the wireless device has received the wireless device-initiated bearer service request. The method may include transmitting, to the wireless device, data using the wireless device-initiated bearer service.

In some embodiments, one or more of the following may be present: The MSISDN may not be concurrently assigned to a second wireless device. A second wireless device may correspond to a second visitor location register (VLR) different from a first VLR that corresponds to the wireless device. The device-initiated bearer service may be general packet radio service (GPRS). The method may include following receiving the request to attach to the wireless network from the wireless device, comparing the IMSI to a blacklist of IMSIs. The method may include determining, in response to the comparison, that the wireless device associated with the IMSI is permitted access, wherein assigning the MSISDN occurs at least partially in response to determining the IMSI is permitted access. The method may include, following transmitting the data using the wireless device-initiated bearer service, determining the wireless device is to be deprovisioned from accessing the wireless network. The method may include deprovisioning the wireless device from accessing the wireless network, wherein deprovisioning comprises revoking the MSISDN to the wireless device, such that the wireless device is required to reattach to the wireless network for future communication using the wireless network. The wireless device may be non-mobile.

In some embodiments, a method for permitting access for communication to a wireless network by a wireless device is presented. The method may include receiving one or more identifiers that correspond to one or more wireless devices with which communication is requested from a third-party computer system comprising an identifier of the wireless device. The method may include storing indications of the one or more identifiers of the one or more wireless devices. The method may include, following storing the indications of the one or more identifiers of the one or more wireless devices, receiving a request to attach to the wireless network from the wireless device, wherein the request specifies an international mobile subscriber identity (IMSI). The method may include, in response to receiving the request, comparing the identifier of the wireless device to the stored indications. The method may include determining, based on the comparison, to permit access to the wireless network. The method may include causing authentication of the wireless device.

In some embodiments, one or more of the following may be present: The method may include transmitting a message to the third-party computer system indicating the wireless device is attached to the wireless network. The method may include receiving data from the third-party computer system to deliver to the wireless device. The method may include transmitting the data to the wireless device. The method may include, following transmitting the data to the wireless device, determining the wireless device is to be deprovisioned from accessing the wireless network. The method may include deprovisioning the wireless device from accessing the wireless network, wherein the wireless device is required to reattach to the wireless network for future communication via the wireless network. The wireless device may be a non-mobile device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
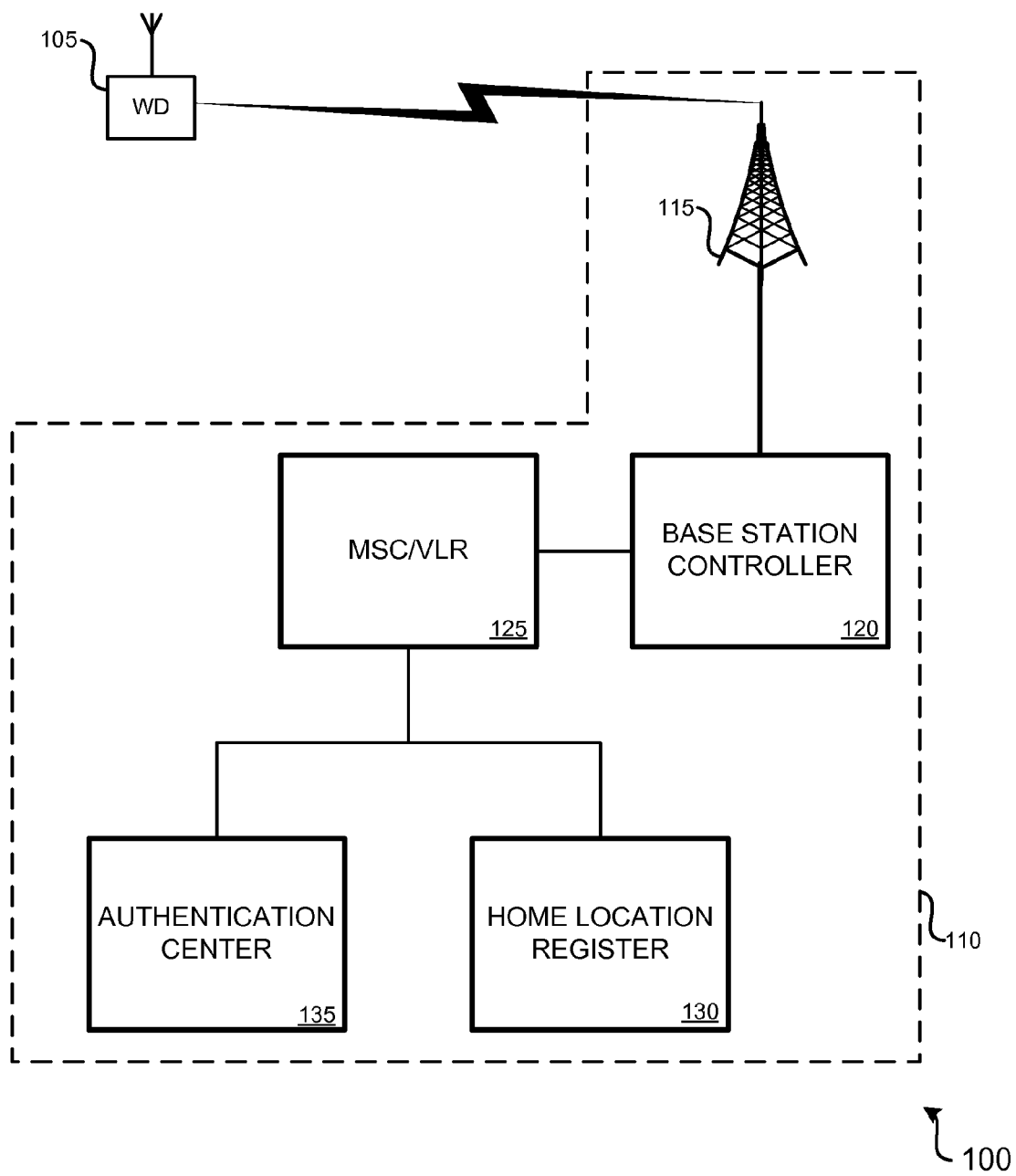
FIG. 1 illustrates an embodiment of a wireless device in communication with a wireless network.

Since only a limited number of MSISDNs may be available for assignment to wireless devices, it may be efficient to have an MSISDN assigned to a wireless device approximately only when the wireless device needs to communicate using the wireless network. The wireless device may then be deprovisioned from the wireless network and the the assignment of the MSISDN to the wireless device may be revoked. The MSISDN may then be reassigned to another wireless device.

Such an arrangement may be particularly useful where the MSISDN of the wireless device is not being used by a human user. For example, sensors may be common wireless devices that need to transmit data periodically using a wireless network without a user needing to dial the MSISDN. Rather than having a permanent MSISDN assigned to the wireless device, an MSISDN may only be assigned when the wireless device temporarily attaches to the wireless network. After one or more predetermined conditions are satisfied, such as a period of time has elapsed, the sensor may be deprovisioned from the wireless network. Such deprovisioning may include revoking the assignment of the MSISDN to the wireless device. This MSISDN may then be assigned to another wireless device. As such, a single MSISDN may be recycled and used for multiple wireless devices.

Such wireless devices may be non-mobile. For example, a sensor configured to use a wireless cellular network may be an electricity meter or gas meter that is stationary. While common mobile wireless devices may include laptops, cellular phones, tablet computers, and ebook readers, non-mobile wireless devices may instead include sensors or other wireless devices that are expected to remain at a fixed location or within a fixed geographical area. Since a non-mobile wireless device may not be expected to move outside of a fixed geographical area, the same MSISDN may be concurrently used by another non-mobile wireless device in another region. Such regions may be defined by the regions of service of mobile switching centers (MSCs) and visitor location registers (VLRs) of the wireless network. Such regions may also be defined by the regions of service of SGSNs.

In some embodiments, a wireless device may attempt to periodically attach to the wireless network. Such an attempt may result in a request for authentication information being routed from the MSC/VLR associated with the location of the wireless device to a detection device associated with the wireless network. This routing may be based on the IMSI of the wireless device. The detection device may determine whether a third-party system has requested that data be transmitted to and/or received from the wireless device. If so, the wireless device may be permitted to attach to the wireless network. If not, the detection device may prevent the wireless device from attaching to the wireless network by returning a denial message, such as a "No Authentication Center (AUC) Entry" message to the MSC/VLR. Upon failing to attach, the wireless device may cease trying to attach to the wireless network for a predetermined amount of time (e.g., a day, a week, a month), at which time the wireless device may again attempt to attach. As such, authentication and assignment of an MSISDN may only occur when communication with the wireless device is requested by a third-party system. As an example, if the wireless device is a gas meter, the third-party system may be a gas metering system configured to periodically retrieve data from the gas meters and/or push updates (e.g., firmware updates) to the gas meters.

In some embodiments, communication with a wireless device using a wireless device-initiated bearer service may be desired. For example, general packet radio service (GPRS) may need to be initiated by the wireless device. As such, a third-party system that desires the wireless device-initiated bearer service to be used may transmit a message to the wireless network (such as a detection device of the wireless network) indicating the wireless device the wireless-device initiated bearer service is desired with. This message may be stored by the detection device until a wireless device attempts to attach. Based on the presence of the message, the wireless device may be permitted to attach to the wireless network. The wireless network may then transmit a message to the wireless device that triggers the wireless device to initiate the wireless device-initiated bearer service. Once the wireless device-initiated bearer service has been initiated, data may be exchanged between the wireless device and the third-party using the wireless device-initiated bearer service via the wireless network and/or the detection device.

In one aspect, the wireless device may operate on a wireless network referred to as a "wide area cellular" network, including without limitation a Global System for Mobile telecommunications ("GSM") network, a code division multiple access ("CDMA") network, and/or networks operating in accordance with any derivatives thereof (such as General Packet Radio Service ("GPRS"), Enhanced Data rates for GSM Evolution ("EDGE"), CDMA2000, Universal Mobile Telecommunications Standard ("UMTS"), Wideband-CDMA ("W-CDMA"), High Speed Packet Access ("HPSA"), and Evolution-Data Optimized ("EVDO") technologies, among others). While this document focuses on the use of an IMSI as an identifier specific to a (SIM card of a) wireless device, it should be understood that similar systems and methods may be applied to other forms of identifiers.

In some embodiments, when a wireless network receives a message requesting to attach to the wireless network from a wireless device assigned an IMSI number, it may forward this message to a detection device (which may be part of the wireless network or may be operated by a third-party), which selects a temporary MSISDN number for the IMSI and provides a profile for the wireless device to the wireless network (and/or more particularly, the appropriate equipment, such as a VLR and/or visited MSC). This profile, which contains the temporary MSISDN number, provides the wireless device with sufficient access to the wireless network to complete a session, such as to receive and/or transmit data. An MSISDN may refer to a dialable number that a caller may dial to communicate with a wireless device.

The detection device may permit or block activation of a wireless device based on the IMSI of the wireless device's SIM card. If the IMSI of the wireless device (that is, the IMSI of the SIM card of the wireless device) is listed in a blacklist that is accessible to the detection device, activation of the wireless device associated with the IMSI may be blocked. Such a blacklist may be maintained manually and/or automatically. An administrator may add and/or remove IMSIs to and from the blacklist. IMSIs may automatically be added to (and/or removed from) the blacklist based on one or more predefined rules. For example, if a wireless device associated with an IMSI attempts to transmit above a threshold number of messages within a period of time, the IMSI may be added to the blacklist.

The detection device, in accordance with some embodiments, may provide sufficient signaling support to allow the wireless network to register and manage the wireless device.

In some embodiments, authentication may be conducted by the detection device without accessing an AUC. In some embodiments, during activation, rather than having a single AUC provisioned, two or more AUCs may be provisioned. The first AUC to complete the provisioning process may receive authentication information linked with a wireless device being activated. By provisioning multiple AUCs, the latency during activation may be decreased because only one AUC may need to respond to the provisioning request.

Once a wireless device has been attached with the wireless network, data may be transmitted to and/or received from the wireless device. The data transmitted to and/or received from the wireless device may terminate with the detection device or may be routed to and from a third-party computer system. Such a third-party computer system may be operated by some other entity, such as the entity operating the wireless devices that data is being exchanged with. While the MSISDN of the wireless device may change, one or more identifiers may be present that allow the detection device and/or a third-party system to address a wireless device. For instance, the IMSI of the wireless device may not change and may be used for addressing the wireless device. Alternatively, a separate identifier may be specified by the third-party system that may be linked with the IMSI of the wireless device at the detection device. Further, a combination of the MSISDN and an identifier of the MSCNLR that is servicing the wireless device may be used to address the wireless device.

While the following systems and methods discuss the use of IMSIs, it should be understood that similar systems and method may be used with some other form of identifier and the description of IMSIs should not be interpreted as limiting.

FIG. 1 illustrates an embodiment 100 of a wireless device 105 in communication with a wireless network 110. Wireless network 110 may include a signaling system 7 ("SS7") network. It also may be possible for wireless network 110 to include one or more of a wireless intelligent network ("WIN"), a public switched telephone network ("PSTN"), and/or a data network (such as an Internet Protocol network, which can include the Internet, an Intranet, and/or the like). In embodiment 100 of FIG. 1, wireless network 110 comprises (and/or provides communication between) base station 115, base station controller (BSC) 120, a mobile switching center (MSC) 125, a home location register (HLR) 130, and an authentication center (AUC) 135. One skilled in the art will appreciate that wireless network 110 may include other components, such as a switching service point, intelligent peripheral, etc., and/or that wireless network 110 often will comprise multiple base stations, base station controllers, mobile switching centers, home location registers, and/or authentication centers. Likewise, it is possible that two or more of these components might be integrated in a single device.

Generally, wireless device 105 has associated therewith an identification number. The identification number may be specific to a wireless device or a SIM card of the wireless device. As such, the identification number, which may be an IMSI, may not be the same as another IMSI of another wireless device 105 configured to attach to wireless network 110. The IMSI may identify wireless device 105 to the network, and/or an addressing number (which may be, but need not necessarily be, an MSISDN), which may be used by wireless network 110 to address wireless device 105 when communicating with wireless device 105.

In normal operation, when an activated wireless device 105 registers with wireless network 110 (e.g., wireless device 105 is powered on, enters the service area, etc.), it sends a message, which is received at the base station controller 120 (usually via the base station 115). The message generally will include the IMSI of the SIM card of wireless device 105, either explicitly or implicitly (e.g., the base station controller 120 will be able to ascertain the identification number and associate it with the message, if necessary). (For simplicity, this phrase may be abbreviated to "the IMSI of wireless device 105," which should be interpreted to include the IMSI of the SIM card of a wireless device.) The MSC 125 (or some other component of wireless network 110) thus identifies the identification number of the wireless device 105 and queries the HLR 130, which returns to the MSC 125 data about the wireless device 105. (While this document, for ease of description, refers to communications between the MSC 125 and other devices, one skilled in the art will appreciate that, in practice, it is often either a visitor location register ("VLR"), which, in many cases, is collocated with the MSC 125, the MSC 125 itself and/or some combination thereof, that participates in such communications. Hence, this document sometimes refers to the MSC and VLR collectively, and references herein to operations involving the MSC 125 should be considered to include operations that might involve a VLR as well. Such data can include the addressing number of wireless device 105, as well as the capabilities of wireless device 105.

Typically, a security key is used to secure communications between wireless device 105 and the wireless network 110. This security key (often implemented as a set of data "triplets" comprising a signed response, session key, and a random number) is generated by the authentication center 135, based on a shared secret stored in the wireless device (often referred to as Ki) and in a record in the authentication center 135. In a typical implementation, the HLR 130 forwards the query (or at least the wireless device's identification number) to the authentication center 135 as well. The authentication center 135 correlates the wireless device's identification number with the shared secret, such that when provided the identification number, the authentication center 135 can generate the security key based on the shared secret for that wireless device and return it to the MSC 125, which can use that data to authenticate the wireless device 105.

Once the MSC 125 has obtained the data from the HLR 130 and authenticated wireless device 105 based on the security key, wireless device 105 is operable on wireless network 110. In this typical implementation, however, the activation process populates HLR 130 and authentication center 135 with data about wireless device 105, including the identification number and shared secret. Hence, if wireless device 105 has not been activated, neither HLR 130 nor authentication center 135 may contain records corresponding to the identification number of wireless device 105, thereby preventing wireless device 105 from registering with wireless network 110 and thus rendering wireless device 105 at least partially inoperable on wireless network 110.

Figure 2:
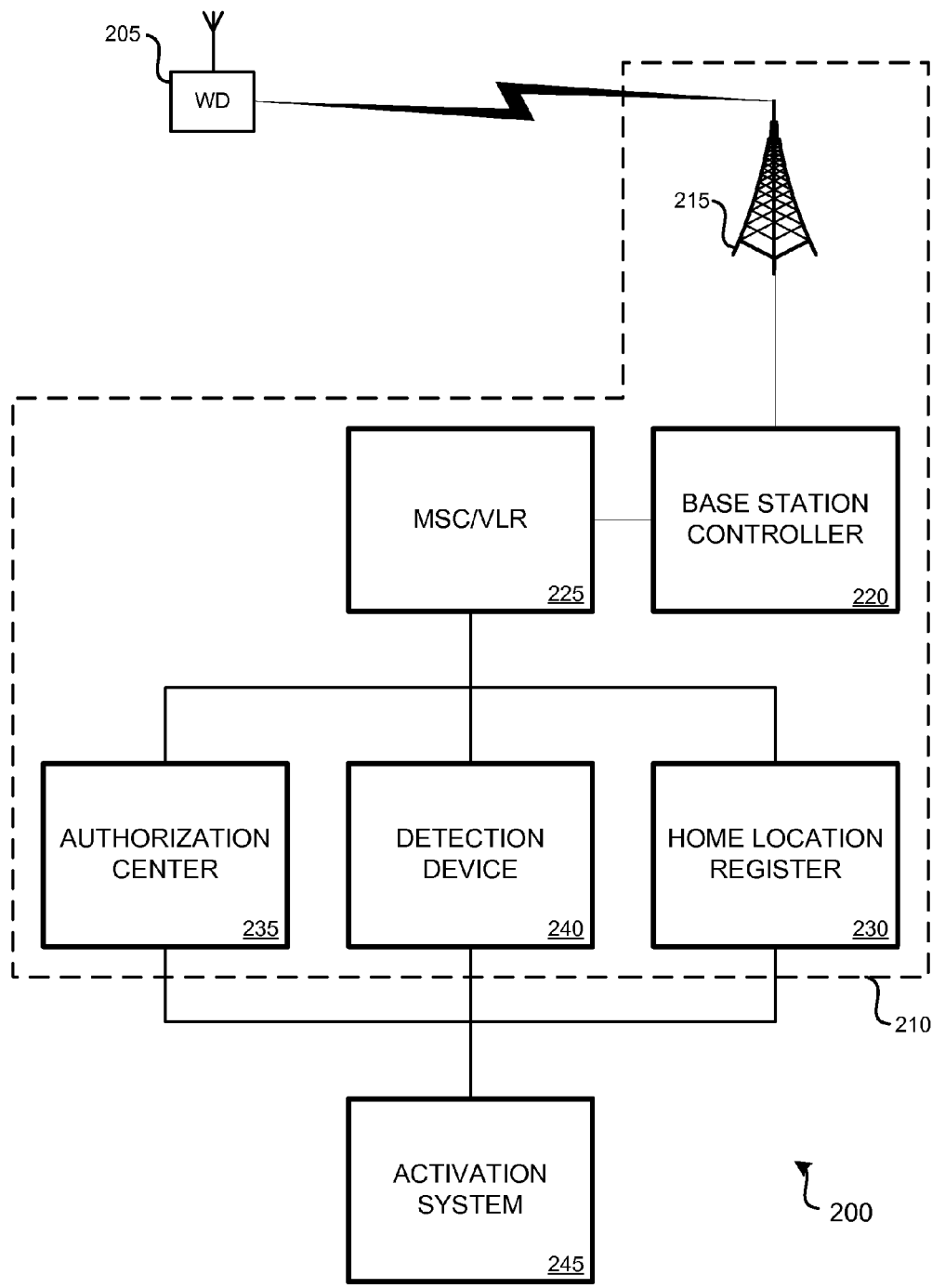
FIG. 2 illustrates an embodiment of a wireless network configured to provide access to a wireless device.

FIG. 2 illustrates an embodiment 200 of a wireless network 210 configured to activate wireless device 205 for using wireless network 210. Embodiment 200 is similar to embodiment 100 of FIG. 1, and it may operate in similar fashion once wireless device 205 has been activated. Embodiment 200, however, is configured to allow wireless device 205 to perform its own activation. In accordance with a set of embodiments, in addition to base station 215, BSC 220, MSC/VLR 225, HLR 230 and AUC 235, embodiment 200 includes a detection device 240 and an activation system 245. Detection device 240 can be a device and/or computer system that is configured to perform functions ascribed herein to a detection device. In some cases, detection device 240 may be implemented by a modified HLR; in other cases, detection device 240 may perform only detection services. Activation system 245 may be present. Activation system 245 can be any computer system and/or device that comprises the necessary configuration and/or software to perform the functions described below to activate the wireless device 205 through wireless network 210. In some embodiments, activation system 245 is a single computer; in other embodiments, it may be a group of computers that collectively provide the functionality described herein.

In the illustrated embodiment, detection device 240 resides within wireless network 210, while the activation system 245 is outside wireless network 210, although activation system 245 is in communication (either directly or indirectly) with detection device 240, as well as the HLR 230, AUC 235 and/or MSC/VLR 225. (In various other arrangements, detection device 240 and/or activation system 245 may be either inside or outside wireless network 210 and/or may be in communication, either through wireless network 210 or otherwise, with various components of the network.)

A mode of operation of embodiment 200, and, in particular, detection device 240 and activation system 245, is described in detail below. In a general sense, however, a set of embodiments provides a detection device that is configured to act as a "quasi-HLR." In other words, the detection device (which is not an HLR 230 and generally does not perform the functions of an HLR 230), is configured to be seen by wireless network 210—and, in particular the MSC/VLR 225—as the HLR for an unactivated wireless device 205. Hence, when unactivated wireless device 205 attempts to register with wireless network 210, MSC/VLR 225 queries detection device 240, rather than HLR 230, for data about wireless device 205. MSC/VLR 225 may query detection device 240 instead of HLR 230 based on the IMSI of wireless device 205. For example, IMSIs in a particular range may be configured for routing to detection device 240. Detection device 240, in turn, may communicate with wireless device 205, such as the assignment of a temporary MSISDN. Once communication with wireless device 205 is complete, wireless device 205 may be deprovisioned from wireless network 210. Deprovisioning may include revoking the MSISDN of the wireless device (thus, freeing the MSISDN to be assigned to another wireless device in the same and/or a different geographical area). In order for future communication via wireless network 210, wireless device 205 may be required to attempt to reattach to the wireless network.

Figure 3:
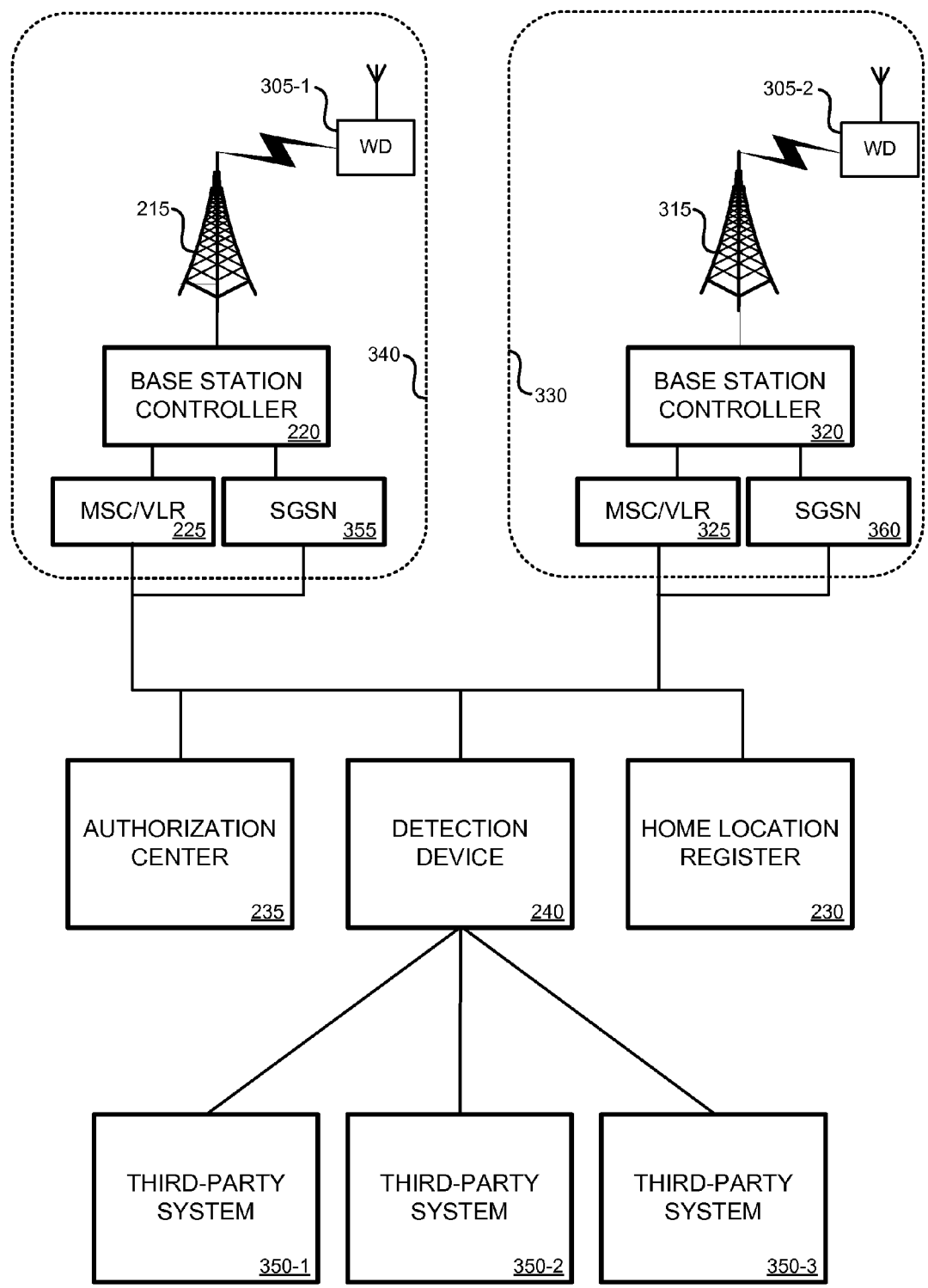
FIG. 3 illustrates an embodiment of a wireless network having multiple cells, the wireless network being configured to provide access to a wireless device and communicate with third-party systems.

FIG. 3 illustrates an embodiment 300 of a wireless network having multiple cells, the wireless network being configured to provide access to a wireless device and communicate with third-party systems. Embodiment 300 is similar to embodiments 100 and 200 described above, and it may operate in similar fashion. Embodiment 300 may be additionally configured to provide occasional network access to wireless devices 305-1 and 305-2 without requiring each wireless device (WD) to be provisioned with a permanent MSISDN. The detection device 240 can be any device and/or computer system that can be configured to perform the function ascribed herein to the detection device 240. (The detection device 240 may also referred to herein as a "first use register" or "FUR".) In some cases, the detection device 240 may be implemented by a modified HLR; in other cases, the detection device 240 may be purpose-built from scratch. The detection device 240 may reside within or outside the wireless network.

In embodiment 300, multiple base stations are illustrated. Base station 215 is in communication with base station controller 220. Base station controller 220 may be in communication with MSC/VLR 225 and/or Serving GPRS Support Node (SGSN) 355, wherein GPRS stands for General Packet Radio Service. Similarly, base station 315 is in communication with base station controller 320. Base station controller 320 is in communication with MSC/VLR 325 and SGSN 360. Base station 215, along with base station controller 220, MSC/VLR 225, and SGSN 355 may serve geographic region 340. Base station 315 along with base station controller 320, MSC/VLR 325 and SGSN 360 may provide wireless service to geographic region 330. Base station 215 may be in communication with one or more wireless devices, such as wireless device 305-1. Wireless device 305-1 may be a non-mobile wireless device. Base station 315 may be in communication with one or more wireless devices, such as wireless device 305-2. Wireless device 305-2 may also be a non-mobile wireless device.

Since each of the illustrated wireless devices are non-mobile, it may be expected that each wireless device will not leave to geographic regions serviced by the corresponding base station. As such, wireless device 305-1 may be expected to remain within geographic region 340 and not enter geographic region 330. As such, the MSISDN assigned to wireless device 305-1 may be the same MSISDN assigned to wireless device 305-2. This arrangement may be permissible as each wireless device is serviced by a different MSC/VLR. As long as each wireless device is not expected to change geographic area, a single MSISDN may be used by multiple wireless devices concurrently as long as each wireless device is serviced by a different MSC/VLR. While illustrated embodiment 300 shows two cells servicing different geographic areas, it should be understood that many more geographic areas may be serviced by additional base stations that are communicatively connected with base station controllers, MSC/VLRs, and SGSNs.

Some or all base station controllers of the wireless network may be in communication with an SGSN in addition to an MSC/VLR. Use of GPRS via an SGSN may enable an increased amount and/or rate of data to be transferred to and from a wireless device, such as wireless device 305-1. Some bearer services may need to be initiated by the wireless device. Such bearer services are referred to as wireless device-initiated bearer services. For instance, GPRS may be a wireless device-initiated bearer service.

In embodiment 300, detection device 240 is in communication with three third-party systems. Each of these third-party systems may represent computer systems. Each of third-party systems 350 may be operated by a different third-party. Third-party systems 350 may be computer systems configured to transmit data to and/or receive data from wireless devices. For example, each third-party system may be associated with one or more wireless devices configured to use the wireless network of FIG. 3. As an example, third-party system 350-1 may be a gas metering system configured to gather readings from sensors using the wireless network. Each of these sensors may be a wireless device that may be at least temporarily provided access to the wireless network. As example, wireless device 305-1 may be a gas meter attached to a building.

A third-party system may be able to provide an identifier of a particular wireless device that the third-party system desires to communicate with. Messages to be transmitted to the wireless device may be received by detection device 240. For example, detection device 240 may execute an API that permits third-party systems 350 to communicate with the detection device. Detection device 240 may provide an indication to the appropriate third-party system when an associated wireless device has been permitted access to the wireless network. The third-party system may then receive data from the wireless device and/or transmit data to the wireless device. Such messages to be transmitted to and/or received from the wireless device by a third-party system may be, at least temporarily, stored by detection device 240. Detection device 240 may only permit a wireless device to attach to the wireless network when the wireless device's associated third-party system has requested communication with the wireless device.

While the MSISDN of a wireless device may periodically change, another identifier may be used by a third-party system to address the wireless device. For example, an IMSI of the wireless device may not change. When a third-party system desires to communicate with a particular wireless device, the third-party system may provide a request that indicates the IMSI of the wireless device to detection device 240. Based on the IMSI, detection device 240 may communicate with the appropriate wireless device. A third-party system may also use an arbitrary identifier selected by the third-party system (or an operator of the third party system) to identify the wireless device to detection device 240. Detection device 240 may have sufficient data that indicates the IMSI of the wireless device indicated by the arbitrary identifier. In some embodiments, a combination of an identifier of the MSC/VLR servicing the wireless device and the wireless device's MSISDN may be used to identify the wireless device.

Figure 4:
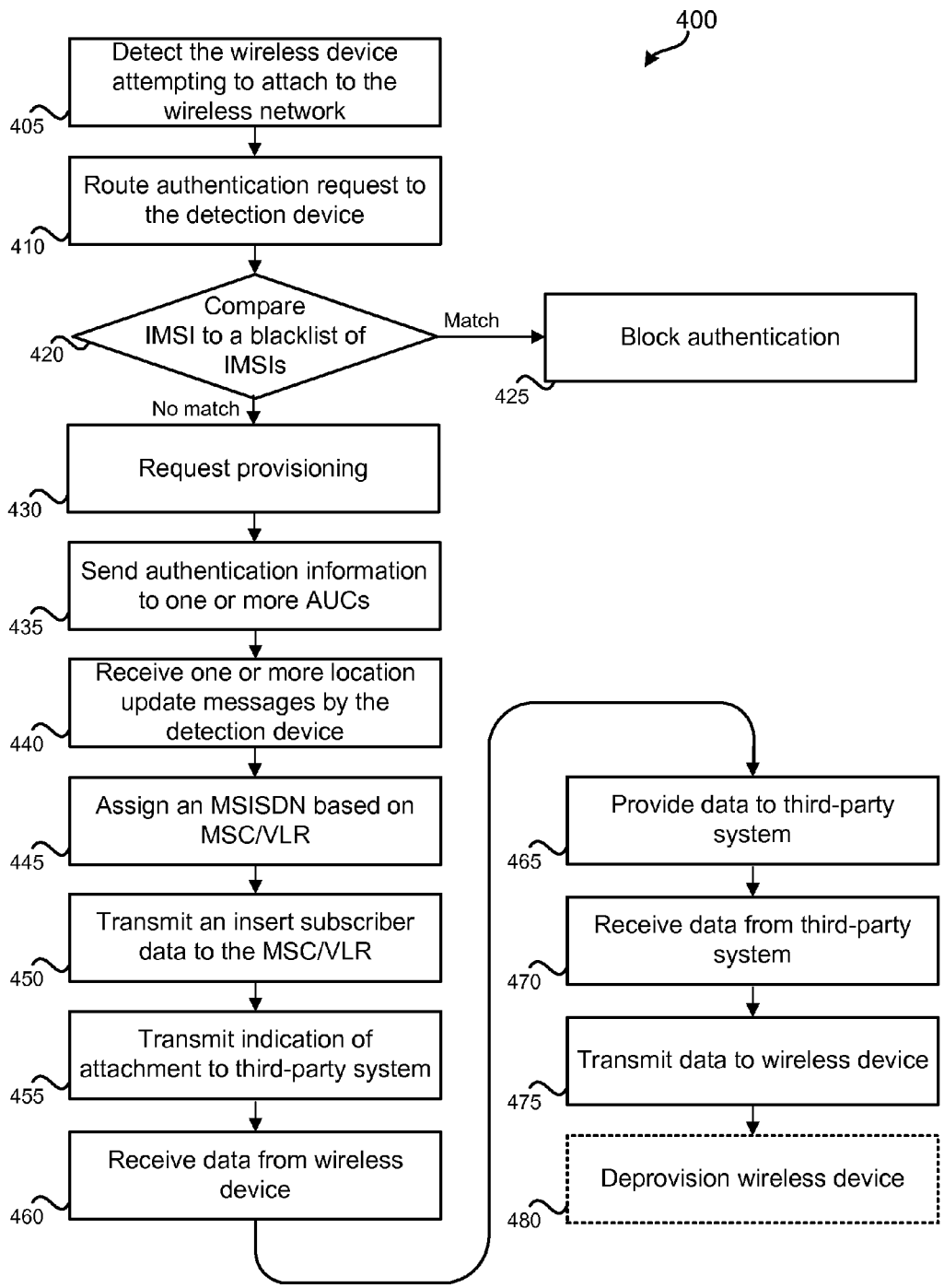
FIG. 4 illustrates an embodiment of a method for assigning a single MSISDN to multiple wireless devices.

Various methods may be performed using the described systems. FIG. 4 illustrates an embodiment of a method for assigning a single MSISDN to multiple wireless devices concurrently. Method 400 may be performed in conjunction with system 300 of FIG. 3. Method 400 may also be performed using some other form of wireless network that permits an MSISDN to be assigned to multiple wireless devices. Each step of method 400 may be performed by a computer system. More specifically, each step of method 400 may be performed by a wireless network that contains at least one detection device. In some embodiments, the detection device may be external to the wireless network. Steps 420 through 480 of method 400 may be performed by a detection device. The wireless devices of method 400 may be non-mobile wireless devices.

Prior to performing method 400, the wireless network may be configured to accommodate the activation process. One method of configuring the wireless network is described in further detail in method 600 of FIG. 6 of U.S. patent application Ser. No. 12/197,396, previously incorporated by reference. At step 405, a wireless device communicatively coupled with a SIM having an IMSI is detected by the wireless network. For example, this may occur when the wireless device enters a service area of the wireless network or is turned on while within a service area of the wireless network.

At step 410, a detection device may receive an authentication request. This authentication request may be routed to the detection device by the wireless network. The authentication request may be in the form of a "send authentication information" message received from an MSC (and/or VLR) servicing the wireless device. The authentication request may result from the wireless device initially attempting to attach to the wireless network at step 405, such as wireless network 210 of FIG. 2 or the wireless device of FIG. 3. The authentication request may be routed to the detection device based on the IMSI of the wireless device. For example, a designated range of IMSIs may be routed by the wireless network to the detection device. The authentication request may contain the IMSI of the wireless device attempting to attach to the wireless network. While method 400 discusses the use of an MSC and/or VLR, it should be understood that a Serving GPRS Suport Node (SGSN) may be used instead.

At step 420, the IMSI received as part of the authentication request at step 405 may be compared to a blacklist of IMSIs. Such a blacklist may list one or more IMSIs that are prohibited from being permitted access to the wireless network. As an example, IMSIs of SIM cards that are known to be stolen may be listed on the blacklist. As such, stolen prepaid phones may be prevented from being permitted access to the wireless network. The creation and modification of such a blacklist is described in more detail in reference to method 700 of FIG. 7.

If the IMSI received as part of the authentication request matches an IMSI listed in the blacklist, method 400 may proceed to step 425. At step 425, authentication, and thus activation of the wireless device, may be blocked by the detection device. As such, the wireless device may not be permitted access for one or more uses on the wireless network. For example, incoming and outgoing calls, text messages, and internet access may be blocked. Some services, such as emergency services, may be enabled. The detection device may return one or more messages to the MSC/VLR that indicates that authentication of the wireless device associated with the IMSI is prohibited, such as a "No AUC Entry" message. The detection device returning such messages to the MSC/VLR may not require any interaction with an AUC and/or an HLR of the wireless network.

If the IMSI received as part of the authentication request does not match an IMSI listed in the blacklist, method 400 may proceed to step 430. By the IMSI received as part of the authentication request at step 405 not being present on the blacklist, it may be determined that the IMSI (and, thus, the associated wireless device) is eligible for activation. While at step 405 the IMSI received as part of the authentication request by the detection device is compared to a blacklist of IMSIs, it should be understood that a similar comparison may be conducted to a whitelist of IMSIs. In such a comparison, activation of the IMSI received as part of the authentication request at step 405 may only be permitted if the received IMSI is affirmatively listed on the whitelist. Activation may be blocked if the IMSI is not listed on the whitelist.

One or more AUCs may be used for authentication. At step 430, the detection device may request provisioning by one or more AUCs. This may involve one or more AUC entries being made for the IMSI associated with the wireless device. Before transmitting the authentication information to an AUC, the detection device may wait for a response indicating that provisioning has been completed. As such, authentication information may be held by the detection device until provisioning has been completed.

At step 435, the authentication information may be transmitted to the first AUC that completes provisioning. For example, at step 435, the provisioning request may have been transmitted to multiple AUCs. However, only one of these provisioning requests may need to be completed successfully in order to continue with the method 400. As such, preference may be given to the first AUC to respond to the provisioning request. As such, latency in completing the activation process may be improved. At step 435, the fastest AUC to respond to the provisioning request of step 430 may receive the authentication information. Therefore, the AUC with the fastest response time to the request may be selected to be used for authentication. If one or more of the AUCs have been pre-provisioned, step 435 may be performed following step 420 by transmitting the authentication information to multiple AUCs. At step 435, authentication may be performed by comparing the Ki values from the SIM card against those specified by the SIM card manufacturer, which may already be stored in the AUC. In some embodiments, the Ki values on the SIM card may be transmitted to multiple AUCs. As such, if one AUC responded to the provisioning request sooner, the authentication can be completed sooner, thereby decreasing latency in activating the wireless device. If a timeout response is received from an AUC, the authentication information may be forwarded to a different AUC.

In some embodiments, rather than a provisioning request being performed involving one or more AUCs, the detection device may perform the authentication directly. Such direct authentication may replace step 435 of method 400. Authentication of the IMSI received by the detection device at step 405 may be performed by the detection device. As such, it may be possible for authentication to be performed by the detection device without interacting with an AUC or HLR. The detection device may return one or more messages to the MSC/VLR that indicates the result of the authentication procedure. This authentication performed by the detection device may involve using the encrypted Ki values (or some other encryption values) associated with the IMSI received as part of the authentication request. Following such direct authentication, one or more AUCs may be provisioned. The detection device may receive one or more location update messages from the MSC/CLR associated with the wireless device being permitted access.

At step 440, one or more location update messages may be received by the detection device. These location update messages may be received from the MSC/VLR servicing the wireless device and may have been routed to the detection device based on the IMSI of the wireless device. An entry for the wireless device may be created in the VLR servicing the wireless device.

At step 445, an MSISDN may be assigned to the wireless device. This MSISDN may be permanent or temporary. The MSISDN selected by the detection device may be based upon the MSC/VLR that is servicing the wireless device. The same MSISDN may be used by multiple wireless devices. However, each of the wireless devices using the same MSISDN may be serviced by different MSC/VLRs. Accordingly, each MSC/VLR may service only one wireless device associated with a particular MSISDN. Therefore, an MSISDN that has not been assigned to a wireless device that is being serviced by a particular MSC/VLR may be selected. Accordingly, the wireless device has a unique MSISDN at least within the service area of the MSC/VLR. Other wireless devices may have the same MSISDN, but each such wireless device is serviced by different MSC/VLRs. Two, three, four, five, or some greater number of wireless devices may each be associated with the same MSISDN.

At step 450, an insert subscriber data message may be transmitted to the appropriate MSC/VLR. This message may identify various services that the wireless device is capable of, such as receiving and/or sending SMS messages, emergency services, placing and/or receiving phone calls, and/or web services. Following step 450, the wireless device may be permitted to use the bearer services that were identified by the insert subscriber data message.

At step 455, an indication may be transmitted to a third-party system associated with the wireless device that indicates the wireless device is attached to the wireless network. The detection device may select a third-party system to notify based on the IMSI of the wireless device, the combination of the MSISDN and the MSC/VLR servicing the wireless device, or some other identifier that links the wireless device with a particular third-party. An application programming interface (API) of the detection device may be used to provide such an indication to the third party.

At step 460, data from the wireless device may be received by the detection device. This may be data that the wireless device is programmed to transmit periodically. For example, if the wireless device is a gas meter, the wireless device may be programmed to provide data indicating the amount of gas that has passed through the gas meter. The data received from the wireless device may be received via a bearer service, such as SMS (short message service) or USSD (unstructured supplementary service data).

At step 465, this data received from the wireless device may be provided to the third-party system. This third-party system may serve as some form of centralized logging and/or monitoring system. As such, the third-party system may obtain similar data from a large number of wireless devices, such as 10, 100, or 1000 wireless devices. When provided to the third-party system, this data may be identified by an identifier specific to the wireless device, such as the wireless device's IMSI, a combination of the device's MSISDN and indication of the MSC/VLR servicing the wireless device, or some other identifier which may have been specified by the third-party system. Providing the data to the third-party system may involve the data being automatically transmitted to the third-party system by the detection device. In some embodiments, the data may be made available for retrieval (e.g., downloading) by the third-party system.

At step 470, data from the third-party system may be received that is intended to be transmitted to the wireless device. This data may be identified by an identifier specific to the wireless device, such as the wireless device's IMSI, a combination of the wireless device's MSISDN and indication of the MSC/VLR servicing the wireless device, or some other identifier which may have been specified by the third-party system. Such data may be received via an API of the detection device. At step 475, the data, or some portion thereof, may be transmitted to the wireless device. The bearer service used to transmit data to the wireless device may be the same or may be different from the bearer service used by the wireless device to transmit data that was received at step 460.

In some embodiments, following the third-party system receiving the notification at step 455 that the wireless device is attached to the wireless network, the detection device may serve as an intermediary between the third-party system and the wireless device. As such, data, including commands, may be routed back and forth by the detection device between the third-party system and the wireless device.

In some embodiments, method 400 may cease after step 475. The MSISDN assigned to the wireless device at step 445 may remain assigned to the wireless device. Therefore, this MSISDN may be considered a permanent MSISDN because the MSISDN is not released following the conclusion of the data exchange session. In some embodiments, step 480 may be performed. In step 480, the wireless device may be deprovisioned. Deprovisioning may involve the (temporary) MSISDN assigned to the wireless device being revoked such that the MSISDN is no longer assigned to the wireless device. For the wireless device to communicate using the wireless network in the future, the wireless device may be required to reattach to the wireless network such as by repeating the previous steps of method 400. Deprovisioning may involve the wireless device being deprovisioned from the MSC/VLR and, if present, an SGSN.

Whether the wireless device is deprovisioned at step 480 may be based on one or more predefined rules being satisfied. For example, a rule may specify that the wireless device is deprovisioned following a predefined period of time having elapsed. Another rule may indicate that the wireless device is deprovisioned based on a command received from the third-party system associated with the wireless device. As an example of this, the wireless device may transmit a set of stored data to the third-party system. Within this data may be an indication that all requested data has been transferred. The indication may be interpreted by the third-party system. In response to the indication, the third-party system may notify the detection device that the wireless device can now be deprovisioned. In some embodiments, rather than requiring such an indication to be interpreted by the third-party system, the wireless device may provide a similar indication directly to the detection device. As another example of a rule, the detection device may detect that a wireless device has completed transmitting data based on a period of time in which no data has been transferred between the wireless device, the detection device, and/or the associated third-party system.

Figure 5:
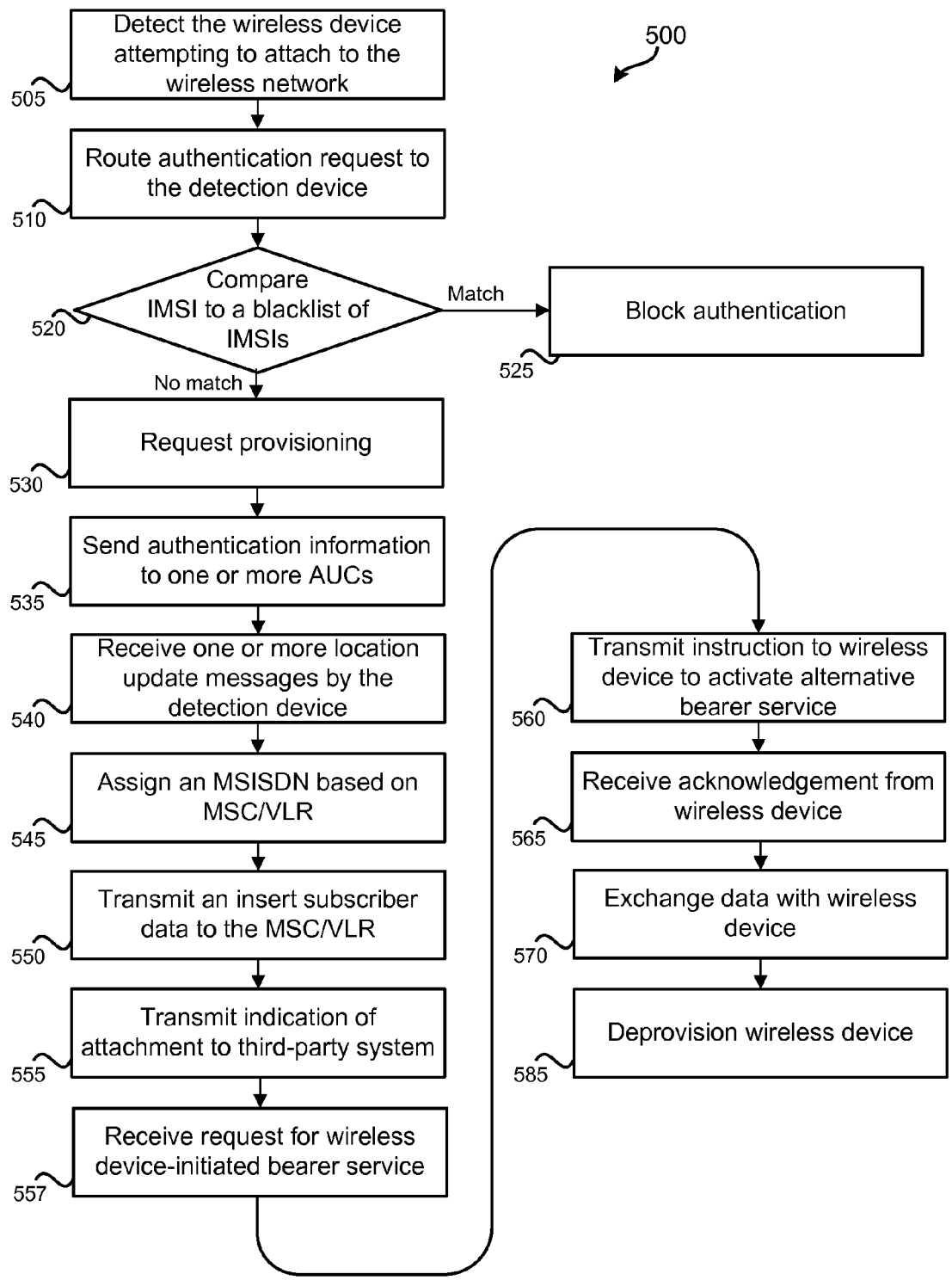
FIG. 5 illustrates an embodiment of a method for remote-initiated use of a wireless device-initiated bearer service.

FIG. 5 illustrates an embodiment of a method 500 for remote-initiated use of a wireless device-initiated bearer service. Method 500 may be performed in conjunction with system 300 of FIG. 3. Method 500 may also be performed using some other form of wireless network that uses a wireless device-initiated bearer service. Each step of method 500 may be performed by a computer system. More specifically, each step of method 500 may be performed by a wireless network that contains at least one detection device. In some embodiments, the detection device may be external to the wireless network. Method steps 520 through 585 may be performed by a detection device. The wireless devices of method 500 may be non-mobile wireless devices. Steps 505 through 535 of method 500 may correspond to steps 405 through 435 of method 400.

At step 545, an MSISDN may be assigned to the wireless device. This MSISDN may be permanent or temporary. The MSISDN selected by the detection device may be based upon the MSC/VLR that is servicing the wireless device. The same MSISDN may be used by multiple wireless devices. However, each of the wireless devices using the same MSISDN may be serviced by different MSC/VLRs. Accordingly, each MSC/VLR may service only one wireless device associated with a particular MSISDN. Therefore, an MSISDN that has not been assigned to a wireless device that is serviced by a particular MSC/VLR may be selected. Accordingly, the wireless device has a unique MSISDN at least within the service area of the MSC/VLR. Another wireless device may have the same MSISDN but is serviced by a different MSC/VLR. In some embodiments, the MSISDN assigned at step 545 may be specific to only the wireless device and may not be assigned to multiple wireless devices. Steps 550 and 555 may correspond to steps 450 and 455 of method 400, respectively.

Following attachment to the wireless network, data may be transmitted from the wireless device to the detection device using a first bearer service, such as the USSD or SMS. Similarly, data may be transmitted to the wireless device using the first bearer service. Such data transmission may be similar to steps 460 through 475 of method 400. Following transmission of and/or reception of data using the first bearer service, another bearer service may be used for additional data. For example, a different bearer service may be desired due to limits on the rate and/or amount of data that can be transmitted via the first bearer service. For example, data transmitted via SMS may be limited to very few characters, such as 160, per message.

At step 557, a request may be received from a third-party system indicating that a wireless device-initiated bearer service is to be used. The indication may identify the wireless device using an identifier specific to the wireless device, such as the wireless device's IMSI, a combination of the device's MSISDN and indication of the MSC/VLR servicing the wireless device, or some other identifier which may have been specified by the third-party system.

At step 560, an instruction to the wireless device may be transmitted to activate a wireless device-initiated bearer service. This instruction to activate the wireless device-initiated bearer service may occur via the first bearer service. As an example, an SMS text message may be sent from a third-party system, via the detection device, to the wireless device indicating that the wireless device-initiated bearer service should be started. A wireless device-initiated bearer service may only be initiated by a wireless device. As such, a third-party system or the detection device may be unable to initiate the wireless device-initiated bearer service (e.g., GPRS packet data) unilaterally.

At step 565, an acknowledgement may be received from the wireless device that indicates the request for the wireless device-initiated bearer service has been received. This acknowledgment may be sent using the first bearer service. Following transmitting the acknowledgment, the wireless device may attempt to attach with the appropriate systems to utilize the wireless device-initiated bearer service. For example, referring to FIG. 3, wireless device 305-1 may attempt to attach with SGSN 355 in order to send and/or receive GPRS packet data, which may be a wireless device-initiated bearer service. The wireless device may then attach to the wireless network via the SGSN (or whatever the appropriate component for the wireless device-initiated bearer service) using an attachment process as detailed in relation to method 400, steps 405 through 455 or in relation to method 500, steps 505 through 555, wherein attachment occurs via the SGSN rather than the MSC/VLR.

At step 570, data may be exchanged using the wireless device-initiated bearer service. As such, data transmitted by a third-party system may be sent to the wireless device via the detection device and/or data from the wireless device may be transmitted to the third-party system via the detection device.

At step 585, the wireless device may be deprovisioned. Deprovisioning may involve an MSISDN assigned to the wireless device being revoked such that the MSISDN is no longer assigned to the wireless device. Deprovisioning the wireless devices may involve the wireless device being deprovisioned to use either the first bearer service, the wireless device-initiated bearer service, or both. For the wireless device to communicate using the wireless network in the future, the wireless device may be required to reattach to the wireless network such as by repeating at least portions of method 500 or method 400. Deprovisioning may involve the wireless device being deprovisioned from the MSC/VLR and/or the SGSN.

Whether the wireless device is deprovisioned at step 585 may be based on one or more predefined rules being satisfied. For example, a rule may specify that the wireless device is deprovisioned following a period of time having elapsed. Another rule may indicate that the wireless device is deprovisioned based on a command received from the third-party system associated with the wireless device. As an example of this, the wireless device may transmit a set of stored data to the third-party system. Within this data may be an indication that all necessary data has been transferred. The indication may be interpreted by the third-party system. In response to the indication, the third-party system may notify the detection device that the wireless device can now be deprovisioned. In some embodiments, rather than requiring such an indication to be interpreted by the third-party system, the wireless device may provide a similar indication directly to the detection device. As another example of a rule, the detection device may detect that a wireless device has completed transmitting data based on a period of time which no data has been transferred between the wireless device, the detection device, and/or the associated third-party system.

Figure 6:
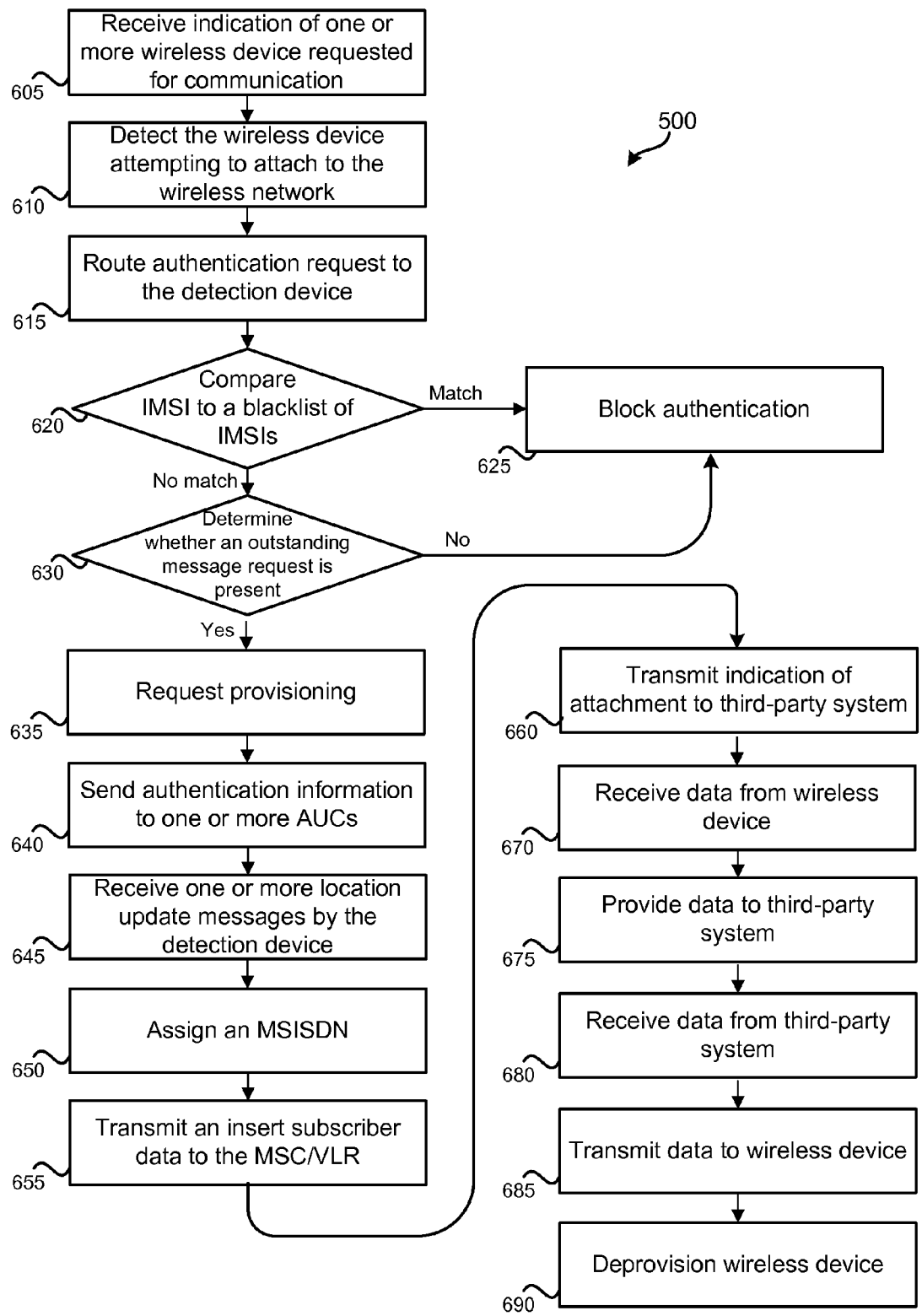
FIG. 6 illustrates an embodiment of a method of authenticating a wireless device when communication with the wireless device has been requested.

FIG. 6 illustrates an embodiment of a method of authenticating a wireless device when communication with the wireless device has been requested. Method 600 may be performed in conjunction with system 300 of FIG. 3. Method 600 may also be performed using some other form of wireless network that can deny authentication based on whether communication with a wireless device has been requested. Each step of method 600 may be performed by a computer system. More specifically, each step of method 600 may be performed by a wireless network that contains at least one detection device. In some embodiments, the detection device may be external to the wireless network. Method steps 605 and 620 through 690 may be performed by a detection device. The wireless devices of method 600 may be non-mobile wireless devices.

At step 605, an indication of one or more wireless devices that a third-party system requests to communicate with may be received. The third-party system may desire to communicate with each of these wireless devices to receive data from and/or to transmit data to the wireless devices. When provided to the detection device, the indication may identify a wireless device, such as the wireless device's IMSI, a combination of the device's MSISDN and indication of the MSC/VLR servicing the wireless device, or some other identifier which may have been specified by the third-party system. Also at step 605, data to be transmitted to each of the wireless devices may be received from the third-party system. Steps 610-625 may correspond to steps 405 through 425 of method 400.

At step 630, a determination may be made as to whether an indication of the wireless device has been received. If an indication indicating the wireless device that attempted to connect to the wireless network at step 610 was received at step 605, the determination at step 630 may be yes. However, if no indication of the wireless device that attempted to attach to the wireless network at step 610 was received at step 605, the determination at step 630 may be no.

If the determination is no, method 600 may proceed to step 625. As such, authentication of the wireless device may be blocked. In response to the authentication being blocked, the detection device may reply to the authentication request of step 615 with a denial. For instance, the denial message may indicate "No AUC entry." As such, the wireless device may abandon attempting to attach with the wireless network, at least temporarily. The wireless device may be configured to attempt to reattach the wireless network after some predefined period of time. By way of example only, the wireless device may attempt to reattach the wireless network hourly, daily, weekly, or monthly.

Accordingly, the wireless device may only be permitted to attach with the wireless network when a third-party system has provided an indication that communication with the wireless device is requested. Such request may also be generated by the detection device. A listing of multiple wireless devices, which may correspond to multiple different third parties, may be maintained in a data storage structure, such as a database, accessible by the detection device. This listing of multiple wireless devices may be used to determine whether the wireless devices are permitted to attach the wireless network or not.

One or more AUCs may be used for authentication. At step 635, the detection device may request provisioning by one or more AUCs. This may involve one or more AUC entries being made for the IMSI associated with the wireless device. Before transmitting the authentication information to an AUC, the detection device may wait for a response indicating that provisioning has been completed. As such, authentication information may be held by the detection device until provisioning has been completed.

At step 640, the authentication information may be transmitted to the first AUC that completes provisioning. For example, at step 635, the provisioning request may have been transmitted to multiple AUCs. However, only one of these provisioning requests may need to be completed successfully in order to continue with the method 600. As such, preference may be given to the first AUC to respond to the provisioning request. As such, latency in completing the activation process may be decreased. At step 640, the fastest AUC to respond to the provisioning request of step 635 may be transmitted to the authentication information. Therefore, the AUC with the fastest response time to the request may be selected to be used for authentication. If one or more of the AUCs has been pre-provisioned, step 640 may be performed following step 630 by transmitting the authentication information to multiple AUCs. At step 640, authentication may be performed by comparing the Ki values from the SIM card against those specified by the SIM card manufacturer, which may already be stored in the AUC. In some embodiments, the Ki values on the SIM card may be transmitted to multiple AUCs. As such, if one AUC responded to the provisioning request faster, the authentication can be performed sooner, just decreasing latency in activating the wireless device. If a timeout response is received from an AUC, the authentication information may be forwarded to a different AUC.

In some embodiments, rather than a provisioning request being performed involving one or more AUCs, the detection device may perform the authentication directly. Such direct authentication may replace step 640 of method 600. The request for authentication of the IMSI received by the detection device at step 615 may be performed by the detection device. As such, it may be possible for authentication to be performed by the detection device without interacting with an AUC or HLR. The detection device may return one or more messages to the MSC/VLR that indicates the result of the authentication procedure. An AUC may be contacted for provisioning. This authentication performed by the detection device may involve using the encrypted Ki values (or some other encryption values) associated with the IMSI received as part of the authentication request. The detection device may receive one or more location update messages from the MSC/VLR associated with the wireless device being permitted access.

At step 645, one or more location update messages may be received by the detection device. These location update messages may be received from the MSC/VLR servicing the wireless device and may have been routed to the detection device based on the IMSI of the wireless device.

At step 650, an MSISDN may be assigned to the wireless device. This MSISDN may be permanent or temporary. The MSISDN selected by the detection device may be based upon the MSC/VLR that is servicing the wireless device. The same MSISDN may be used by multiple wireless devices. However, each of the wireless devices using the same MSISDN may be serviced by different MSC/VLRs. Accordingly, each MSC/VLR may service only one wireless device associated with a particular MSISDN. Therefore, an MSISDN that has not been assigned to a wireless device that is being serviced by a particular MSC/VLR may be selected. Accordingly, the wireless device has a unique MSISDN at least within the service area of the MSC/VLR. Other wireless devices may have the same MSISDN, but each such wireless device is serviced by a different MSC/VLR. Two, three, four, five, or some greater number of wireless devices may be associated with the same MSISDN concurrently. In some embodiments, the MSISDN assigned at step 650 is particular to only the wireless device and is not also used by other wireless devices.

At step 655, an insert subscriber data message may be transmitted to the appropriate MSC/VLR. This message may identify various services that the wireless device is capable of, such as receiving and/or sending SMS messages, emergency services, placing and/or receiving phone calls, and/or web services. Following step 655, the wireless device may be permitted to use the bearer services that were identified by the insert subscriber data message.

At step 660, an indication may be transmitted to a third-party system associated with the wireless device that indicates the wireless device is attached to the wireless network. The detection device may select a third-party system to notify based on the IMSI of the wireless device, the combination of the MSISDN and the MSC/VLR servicing the wireless device, or some other identifier that links the wireless device with a particular third-party. An application programming interface (API) of the detection device may be used to provide such an indication to the third party.

At step 670, data from the wireless device may be received by the detection device. This may be data that the wireless device is programmed to transmit periodically. For example, if the wireless device is a gas meter, the wireless device may be programmed to provide data indicating the amount of gas that has passed through the gas meter. The data received from the wireless device may be received via a bearer service, such as SMS (short message service) or USSD (unstructured supplementary service data).

At step 675, this data received from the wireless device may be provided to the third-party system. This third-party system may serve as some form of centralized logging and/or monitoring system. As such, the third-party system may obtain similar data from a large number of wireless devices, such as 10, 100, or 1000 wireless devices. When provided to the third-party system, this data may be identified by an identifier specific to the wireless device, such as the wireless device's IMSI, a combination of the device's MSISDN and indication of the MSC/VLR servicing the wireless device, or some other identifier which may have been specified by the third-party system. Providing the data to the third-party system may involve the data being automatically transmitted to the third-party system by the detection device. In some embodiments, the data may be made available for retrieval (e.g., downloading) via an API by the third-party system.

At step 680, data from the third-party system may be received that is intended to be transmitted to the wireless device. This data may be identified by an identifier specific to the wireless device, such as the wireless device's IMSI, a combination of the wireless device's MSISDN and indication of the MSC/VLR servicing the wireless device, or some other identifier which may have been specified by the third-party system. Such data may be received via an API of the detection device. This data may have already been received with the indication of the wireless device with which communication was desired at step 605. At step 685, the data, or some portion thereof, may be transmitted to the wireless device. The bearer service used to transmit data to the wireless device may be the same or may be different from the bearer service used by the wireless device to transmit data that was received at step 670.

In some embodiments, following the third-party system receiving the notification at step 660 that the wireless device is attached to the wireless network, the detection device may serve as an intermediary between the third-party system and the wireless device. As such, data, including commands, may be routed back and forth by the detection device between the third-party system and the wireless device.

The MSISDN assigned to the wireless device at step 650 may remain assigned to the wireless device. Therefore, this MSISDN may be considered a permanent MSISDN because the MSISDN is not released following the conclusion of the data exchange session. In some embodiments, step 680 may be performed. In step 690, the wireless device may be deprovisioned. Deprovisioning may involve the (temporary) MSISDN assigned to the wireless device being revoked such that the MSISDN is no longer assigned to the wireless device. For the wireless device to communicate using the wireless network in the future, the wireless device may be required to reattach to the wireless network such as by transmitting another attempt to attach to the wireless network. Deprovisioning may involve the wireless device being deprovisioned from the MSC/VLR and/or an SGSN. Whether the wireless device is deprovisioned at step 690 may be based on rules as previously discussed in relation to methods 400 and 500.

Figure 7:
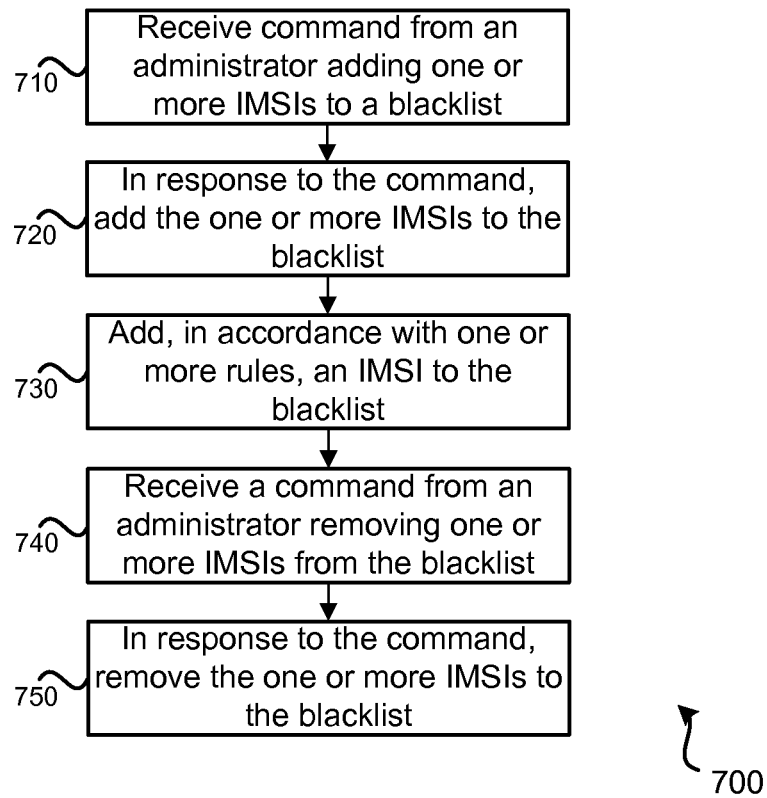
FIG. 7 illustrates an embodiment of a method for modifying an IMSI blacklist.

FIG. 7 illustrates an embodiment of a method 700 for modifying an IMSI blacklist. Method 700 may be performed in conjunction with wireless network 210 of FIG. 2. Method 700 may also be performed by some other wireless network that has, or is in communication with, a detection device, such as detection device 240 of FIG. 2. Each step of method 700 may performed by such a detection device, which may comprise one or more computer systems, such as computer system 900 of FIG. 9. The detection device may be part of the wireless network or may be in communication with the wireless network but operated by a third-party. Each step of method 700 may be performed by a detection device. Various means for performing method 700 include a detection device, which may include one or more computer systems.

At step 710, a command may be received from an administrator to add one or more IMSIs to a blacklist. For example, at step 710 if one or more wireless devices and/or SIM cards were stolen, IMSIs associated with those wireless devices and/or SIM cards may be blocked from having access to a wireless network by being added to the blacklist. The IMSIs of the blacklist may be temporary and/or permanent IMSIs. At step 720, in response to the command received at step 710, the one or more IMSIs received from the administrator may be added to the blacklist.

At step 730, one or more IMSIs may be added automatically to the blacklist without receiving a command directly from the administrator. For example, based on violation of one or more predetermined rules, an IMSI may automatically be added to the blacklist. At step 730, in accordance with one or more rules, an IMSI may be added to the blacklist. As an example, if a wireless device that corresponds with an IMSI attempts to send a number of signaling messages over a predefined threshold number, it may be determined that this IMSI should be added to the blacklist. Other rules may be possible for determining whether an IMSI should be added to the blacklist.

It may also be possible to manually remove IMSIs from the blacklist. At step 740, a command may be received from the administrator to remove one or more IMSIs from the blacklist. At step 750, in response to the command received at step 740, the one or more IMSIs specified may be removed from the blacklist.

While method 700 details the use of a blacklist, it should be understood that a whitelist may be used instead. In a whitelist, rather than adding IMSIs that are to be blocked to the list, IMSIs that are to be permitted access may be added to the whitelist. As such, if an IMSI is to be blocked from being permitted access, the IMSI may be removed from the whitelist. Further, it should be understood that the steps of method 700 may be performed in varying orders. For example, the administrator may remove one or more IMSIs from the blacklist without adding other IMSIs to the blacklist first.

Figure 8:
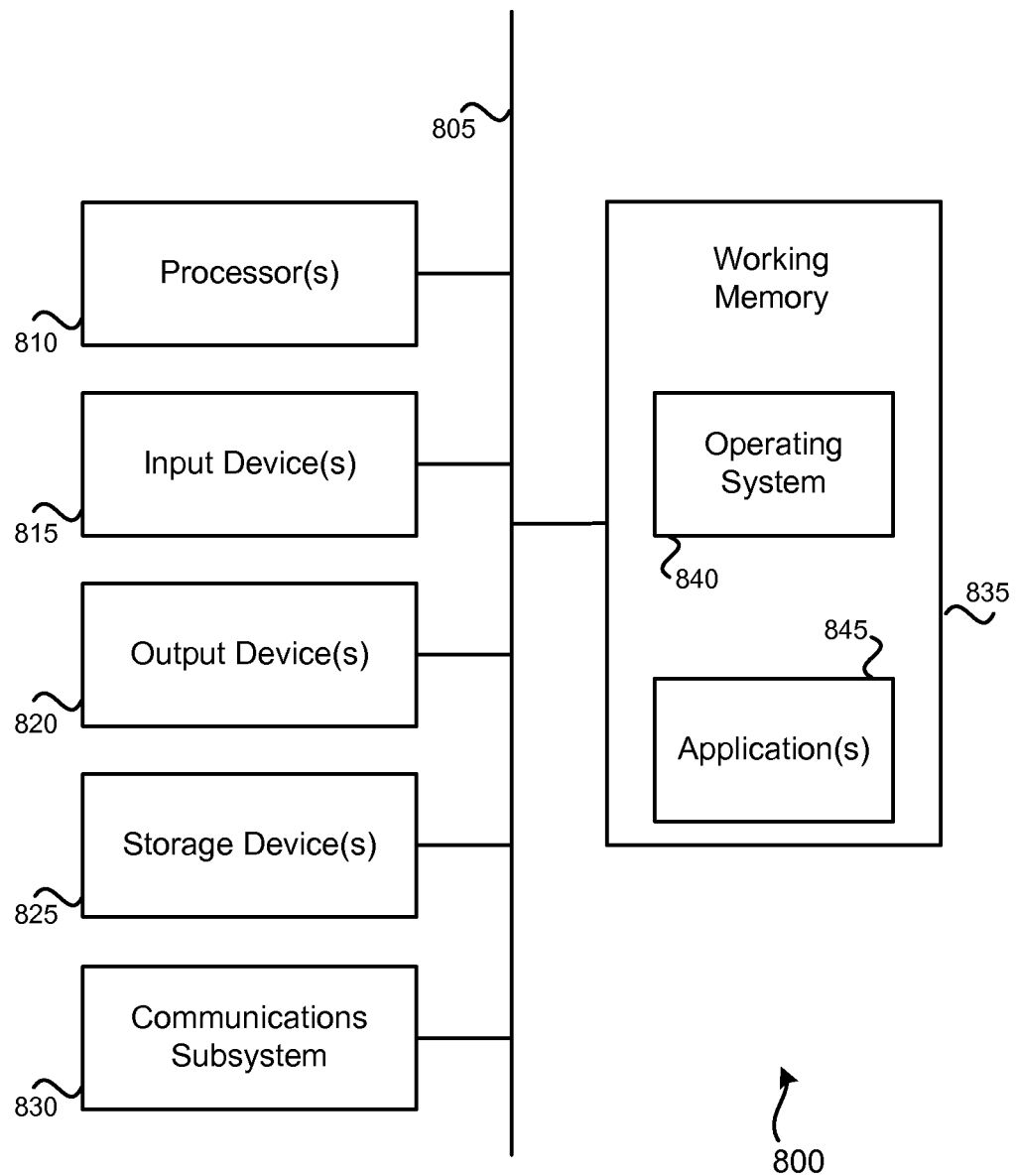
FIG. 8 illustrates an embodiment of a computer system.

A computer system as illustrated in FIG. 8 may incorporate as part of the previously described computerized devices. For example, computer system 800 can represent some of the components of the wireless devices, wireless networks, detection devices, third-party systems, SGSNs, MSC/VLRs, BSCs, HLRs, and/or activation systems. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for occasional access by a wireless device to a wireless network, the method comprising:
   receiving a request to attach to the wireless network from the wireless device, wherein the request specifies a first international mobile subscriber identity (IMSI);
   authenticating the wireless device;
   assigning a mobile subscriber integrated services digital network number (MSISDN) to the wireless device;
   exchanging data with the wireless device via the wireless network;
   determining, by a detection device functioning as part of the wireless network, that the exchange of data with the wireless device is complete; and
   in response to determining by the detection device that the exchange of data with the wireless device is complete, deprovisioning the wireless device from the wireless network, wherein, following being deprovisioned, the wireless device cannot exchange data via the wireless network.

2. The method for occasional access by the wireless devices to the wireless network of claim 1, wherein:
   authenticating the wireless device comprises:
      authenticating, by the detection device, the wireless device, wherein authentication is performed without communication with an authentication center (AUC), a home location register (HLR), or both.

3. The method for occasional access by the wireless devices to the wireless network of claim 1, wherein:
   while exchanging data with the wireless device via the wireless network, an entry in a home location register (HLR) of the wireless network is not present for the wireless device.

4. The method for occasional access by the wireless devices to the wireless network of claim 1, wherein:
   exchanging data with the wireless device comprises sending data to the wireless device and receiving data from the wireless device.

5. The method for occasional access by the wireless devices to the wireless network of claim 1, further comprising:
   following deprovisioning the wireless device from the wireless network, assigning the MSISDN to a second wireless device.

6. The method for occasional access by the wireless devices to the wireless network of claim 1, further comprising:
   transmitting provisioning information corresponding to the wireless device to a plurality of AUCs of the wireless network; and
   receiving a response from at least one of the plurality of AUCs.

7. The method for occasional access by the wireless devices to the wireless network of claim 6, wherein:
   authenticating the wireless device comprises:
      selecting an AUC from the plurality of AUCs of the wireless network to receive authentication information corresponding to the wireless device based on a response time of the response of the AUC to the transmitted provisioning information; and
      transmitting the authentication information corresponding to the wireless device to the selected AUC.

8. A method for occasional access by a wireless device to a wireless network, the method comprising:
   receiving a request to attach to the wireless network from the wireless device, wherein the request specifies a first international mobile subscriber identity (IMSI);

authenticating the wireless device;
assigning a mobile subscriber integrated services digital network number (MSISDN) to the wireless device;
exchanging data with the wireless device via the wireless network;
determining, by a detection device functioning as part of the wireless network, that the exchange of data with the wireless device is complete based on a period of time elapsing without data being transferred from the wireless device; and
in response to the period of time elapsing without data being transferred from the wireless device, deprovisioning, the wireless device from the wireless network, wherein, following being deprovisioned, the wireless device cannot exchange data via the wireless network.

9. The method for occasional access by the wireless devices to the wireless network of claim 8, wherein authenticating the wireless device comprises:
authenticating, by the detection device, the wireless device, wherein authentication is performed without communication with an authentication center (AUC), a home location register (HLR), or both.

10. The method for occasional access by the wireless devices to the wireless network of claim 8, wherein:
while exchanging data with the wireless device via the wireless network, an entry in a home location register (HLR) of the wireless network is not present for the wireless device.

11. The method for occasional access by the wireless devices to the wireless network of claim 8, wherein:
exchanging data with the wireless device comprises sending data to the wireless device and receiving data from the wireless device.

12. The method for occasional access by the wireless devices to the wireless network of claim 8, further comprising:
following deprovisioning the wireless device from the wireless network, assigning the MSISDN to a second wireless device.

13. A method for occasional access by a wireless device to a wireless network, the method comprising:
receiving a request to attach to the wireless network from the wireless device, wherein the request specifies a first international mobile subscriber identity (IMSI);
authenticating the wireless device;
assigning a mobile subscriber integrated services digital network number (MSISDN) to the wireless device;
exchanging data with the wireless device via the wireless network;
transmitting, by a detection device functioning as part of the wireless network, to a third-party computer system;
receiving, by the detection device from the third-party computer system, an indication that all requested data has been received by the third-party computer system; and
in response to receiving the indication from the third-party computer system indicating that all requested data has been received, deprovisioning, by the detection device, the wireless device from the wireless network, wherein, following being deprovisioned, the wireless device cannot exchange data via the wireless network.

14. The method for occasional access by the wireless devices to the wireless network of claim 13, wherein:
authenticating the wireless device comprises:
authenticating, by the detection device, the wireless device, wherein authentication is performed without communication with an authentication center (AUC), a home location register (HLR), or both.

15. The method for occasional access by the wireless devices to the wireless network of claim 13, wherein:
while exchanging data with the wireless device via the wireless network, an entry in a home location register (HLR) of the wireless network is not present for the wireless device.

16. The method for occasional access by the wireless devices to the wireless network of claim 13, wherein:
exchanging data with the wireless device comprises sending data to the wireless device and receiving data from the wireless device.

17. The method for occasional access by the wireless devices to the wireless network of claim 13, further comprising:
following deprovisioning the wireless device from the wireless network, assigning the MSISDN to a second wireless device.

* * * * *